(12) United States Patent
Jeong

(10) Patent No.: US 7,095,702 B2
(45) Date of Patent: Aug. 22, 2006

(54) OPTICAL PICKUP APPARATUS

(75) Inventor: Seong Yun Jeong, Seoul (KR)

(73) Assignee: LG Electronics, Inc., Seoul (KR)

( * ) Notice: Subject to any disclaimer, the term of this patent is extended or adjusted under 35 U.S.C. 154(b) by 576 days.

(21) Appl. No.: 10/122,325

(22) Filed: Apr. 16, 2002

(65) Prior Publication Data

US 2002/0186643 A1    Dec. 12, 2002

(30) Foreign Application Priority Data

Jun. 8, 2001 (KR) ................... 2001-31942

(51) Int. Cl.
*G11B 7/00* (2006.01)

(52) U.S. Cl. ................ 369/112.08; 369/112.23

(58) Field of Classification Search .......... 369/112.08, 369/112.23, 112.24, 44.14, 44.21, 44.27, 369/44.32, 53.14, 53.28, 53.22, 94, 119, 44.23, 369/13.33, 112.01, 112.26, 300; 359/565, 359/634, 796

See application file for complete search history.

(56) References Cited

U.S. PATENT DOCUMENTS

| | | | | |
|---|---|---|---|---|
| 5,768,031 A | * | 6/1998 | Yang | ................ 359/708 |
| 5,978,139 A | * | 11/1999 | Hatakoshi et al. | .......... 359/565 |
| 6,069,853 A | * | 5/2000 | Novotny et al. | ......... 369/13.33 |
| 6,108,292 A | * | 8/2000 | Zijp | ...................... 369/112.24 |
| 6,134,195 A | * | 10/2000 | Kawamura | ............... 369/44.23 |
| 6,292,453 B1 | * | 9/2001 | Ichimura et al. | ....... 369/112.24 |
| 6,298,018 B1 | * | 10/2001 | Takahashi et al. | ....... 369/44.23 |
| 6,438,090 B1 | * | 8/2002 | Nakano | ................. 369/112.24 |
| 6,473,385 B1 | * | 10/2002 | Saito | ..................... 369/112.23 |
| 6,570,827 B1 | * | 5/2003 | Yamamoto et al. | ...... 369/44.14 |
| 6,657,790 B1 | * | 12/2003 | Kim et al. | .................. 359/634 |
| 6,778,472 B1 | * | 8/2004 | Nishikawa | ............... 369/44.21 |
| 6,829,203 B1 | * | 12/2004 | Yonezawa et al. | ....... 369/44.27 |

* cited by examiner

*Primary Examiner*—Thang V. Tran
*Assistant Examiner*—Kim-Kwok Chu
(74) *Attorney, Agent, or Firm*—Birch, Stewart, Kolasch & Birch, LLP

(57) ABSTRACT

The present invention relates to an optical pickup apparatus enabling to reproduce/record data of different kinds of disks in different thicknesses, using one single optical pickup. The optical pickup apparatus includes two objective lens, in which one objective lens has an incident plane and an outgoing plant formed of a flat plane at a designated radius domain from an optical axis, thereby preventing spherical aberration caused by the difference of the thickness between different kinds of disks.

37 Claims, 3 Drawing Sheets

OPTICAL PICKUP APPARATUS

BACKGROUND OF THE INVENTION

1. Field of the Invention

The present invention relates to an optical pickup apparatus. In particular, the present invention relates to an optical pickup apparatus, which enables to reproduce/record data for different kinds of discs with different thicknesses, using an optical pickup.

2. Description of the Related Art

To keep abreast of a recent trend in data digitalization and high capacity data storage, a recording medium also has been changed from a magnetic tape to a disc. Now, the storage capacity of the disc is even enlarged by increasing recording density for recording data in the disk.

As a result of long, untiring efforts for increasing the recording capacity, a digital video disk (hereinafter, it is abbreviated to DVD) having high recording capacity was first developed from the existing compact disk (hereinafter, it is abbreviated to CD). Before long, a high density (hereinafter, it is abbreviated to HD) disk was introduced. Amazingly, the HD disk could record and reproduce the data at a very high density (i.e., twice of CD), using the existing CD. The emitting wavelength from a laser diode light source is also different for each disk. For example, in case of the CD, the wavelength is equal to 780 nm, and in case of the DVD and the HD, the wavelengths are equal to 650 nm and 405 nm, respectively.

The numerical aperture (NA) of a typically used objective lens in an optical pickup apparatus for reproducing HD is equal to 0.85 and the thickness of its disk is equal to 0.1t. Meanwhile, the numerical aperture of the objective lens in an optical pickup apparatus for reproducing DVD is equal to 0.6 and the thickness of its disk is 0.6t.

As aforementioned, the numerical aperture of the HD use objective lens is 0.85, which is larger than the numerical aperture of the DVD use objective lens, 0.6. Therefore, when the HD use optical pickup apparatus is employed, one realizes that one objective lens is not just sufficient to satisfy the numerical aperture requirement. For this reason, two objective lenses are used instead of one, as shown in FIG. 1, to make the numerical aperture 0.85.

FIG. 1 is a schematic diagram showing a configuration of a HD use optical system in the prior art. As depicted in the drawing, the HD use optical system includes a first objective lens 110, whose incident plane 112 and outgoing plane 114 are aspheric, and a second objective lens 120, whose incident plane 122 is spherical but the outgoing plane 124 is flat. Alternatively, the optical system can be configured by making the incident plane 112 and the outgoing plane 114 of the first objective lens 110, and the incident plane 122 of the second objective lens 120 all aspheric, while making the outgoing plane 124 of the second objective lens 120 flat.

Still as another option, the optical system can be configured by making the incident plane 112 of the first objective lens 110 and the incident plane 122 of the second objective lens 120 aspheric, and making the outgoing plane 114 of the first objective lens 110 and the outgoing plane of the second objective lens 120 flat. Here, the reference numeral 130 can be either HD or DVD.

In short, the HD use optical system can have a variety of configurations by alternating the shape of the first objective lens 110 and the second objective lens 120.

However, if one intends to reproduce DVD using two objective lenses appropriate for the HD use optical system, the difference in thickness between HD and DVD, that is, 0.1 t for HD and 0.6 t for DVD, causes spherical aberration, and as the result thereof, signal degradation occurs.

SUMMARY OF THE INVENTION

It is, therefore, an object of the present invention to provide an optical pickup apparatus, which enables to reproduce/record data for different kinds of disks with different thicknesses.

Another object of the present invention is to provide an optical system for use of the optical pickup apparatus.

To achieve the above objects, there is provided an optical system for use of optical pickup apparatus including: two objective lenses, wherein one objective lens has an incident plane and outgoing plane with a flat radius zone from an optical axis.

The coated domain transmits digital video disk (DVD) light beams only by coating the flat domain.

Also, a domain other than the flat domain is formed of an aspheric plane.

The flat domain is mounted with a diffraction element by diffracting high density (HD) use light beams.

In another aspect of the present invention, there is provided an optical system for use of optical pickup apparatus includes a first objective lens, of which incident plane and outgoing plane for light beams are formed of a coated flat plane at a designated radius domain from an optical axis; and a second objective lens, which focuses incident light beams transmitted the coated flat plane of the first objective lens on an arbitrary spot on a disk.

In yet another aspect of the present invention, there is provided an optical system for use of optical pickup apparatus, the system includes a first objective lens, of which incident plane and outgoing plane for light beams are formed at a designated radius domain from an optical axis, being mounted with a diffraction element; and a second objective lens, which focuses incident light beams transmitted the diffraction element of the first objective lens on an arbitrary spot on a disk.

In further another aspect of the present invention, there is provided an optical pickup apparatus includes a light source for emitting light beams separately; a light splitter for transmitting or reflecting the light beams emitted from the light source; a collimator lens for making the light beams progressed from the light splitter into parallel light beams; a reflecting mirror for reflecting the parallel light beams transmitted the collimator lens and alternating an optical path thereof and two objective lens, in which one objective lens has an incident plane and an outgoing plane that form a flat plane at a designate radius domain after being coated, and focuses the alternated light beams at the reflection mirror on an arbitrary spot on a disk.

The coated flat domain transmits digital video disk (DVD) use light beams only, and other uncoated domain except for the coated flat domain transmits high density (HD) use light beams only.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

Figure 1:
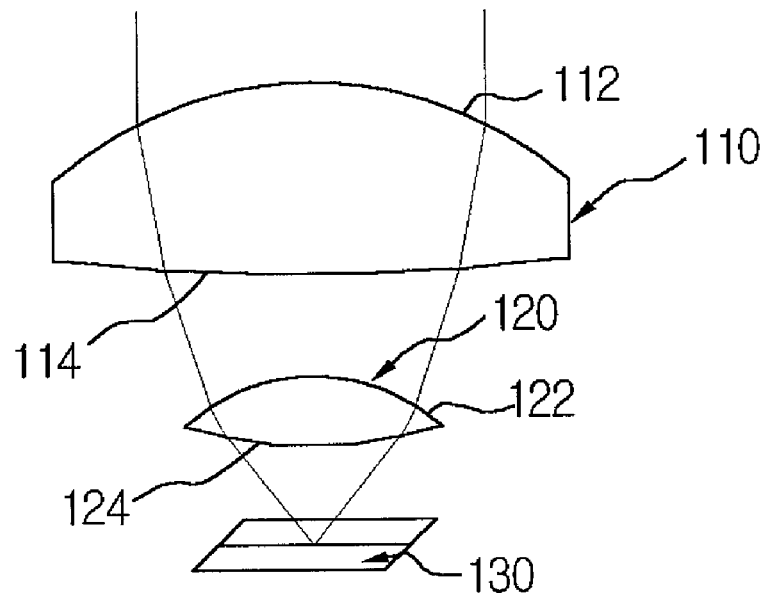
FIG. 1 is a schematic diagram showing a configuration of a high density (HD) use optical system in the prior art.

A preferred embodiment of the present invention will now be described with reference to the accompanying drawings. In the following description, same drawing reference numerals are used for the same elements even in different drawings. The matters defined in the description focus on those that will assist in a comprehensive understanding of the invention. Thus, well-known functions or constructions are not described in detail since they would obscure the invention in unnecessary detail.

In general, an optical pickup apparatus includes a hologram pickup module (HPM) for outputting laser beams for use of compact disk (CD), digital video disk (DVD), or high density (HD), a beam splitter for transmitting or reflecting the light beams outputted from the HPM, a collimator lens for making the light beams from the beam splitter to parallel light beams, a reflecting mirror for alternating an optical path of the parallel light beams that passed through the collimator lens; and an objective lens for focusing the alternated light beams by the reflecting mirror and forming a beam spot on a disk.

As already explained in the prior art, the HD use optical pickup apparatus can focus light beams on a HD use disk by combining two objective lenses.

The present invention also introduces an optical system, in which two objective lenses are used to focus light beams on an arbitrary spot on the disk, in order to make the optical pickup apparatus applicable not only to HD but also to DVD.

Figure 2:
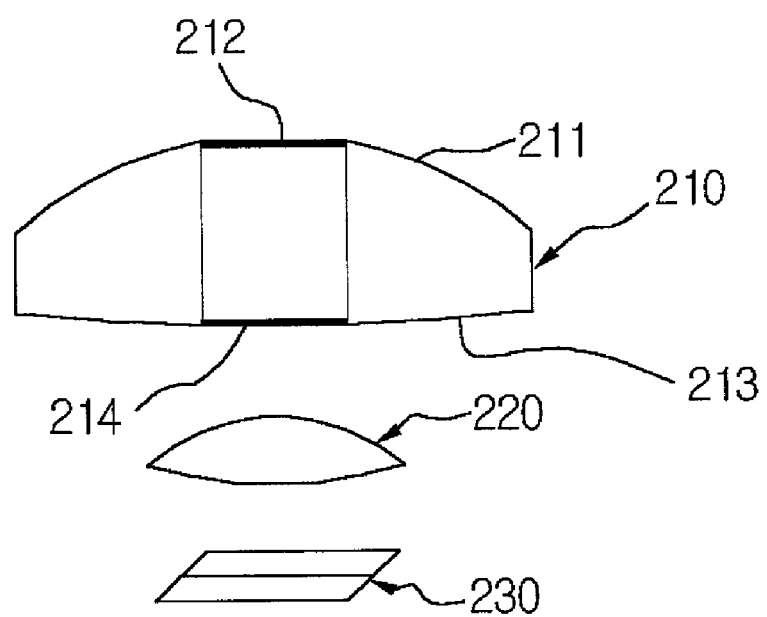
FIG. 2 is a schematic diagram showing a configuration of an optical system for use of an optical pickup apparatus in accordance with the present invention.

FIG. 2 is a schematic diagram showing a configuration of an optical system for use of an optical pickup apparatus in accordance with the present invention. Referring to FIG. 2, the optical system for use of the optical pickup apparatus of the present invention includes; a first objective lens 210, in which an incident plane and an outgoing plane form flat radius domains (hereinafter, it is referred to flat domain) 212 and 214 from an optical axis, and the rest of domain except for the flat domains 212 and 214 forms aspheric domains 211 and 213; and a second objective lens 220, which focuses the incident light beams transmitted through the first objective lens 210 to an optical system use disk 230. Preferably, the optical use disk 230 is a DVD use disk or RD use disk. As long as the primary object or gist of the present invention is not changed, the flat domains 212 and 214 can be formed on either the incident plane or the outgoing plane of the first objective lens 210. More preferably, however, the flat domains 212 and 214 are formed on both the incident plane and the outgoing plane. Therefore, the DVD use light beam is transmitted through the flat domains 212 and 214 of the first objective lens 210, and is focused on the DVD use disk via the second objective lens 220. On the other hand, the RD use light beam is transmitted through the aspheric domains 211 and 213, and is focused on the HD use disk via the second objective lens 220.

Figure 3:
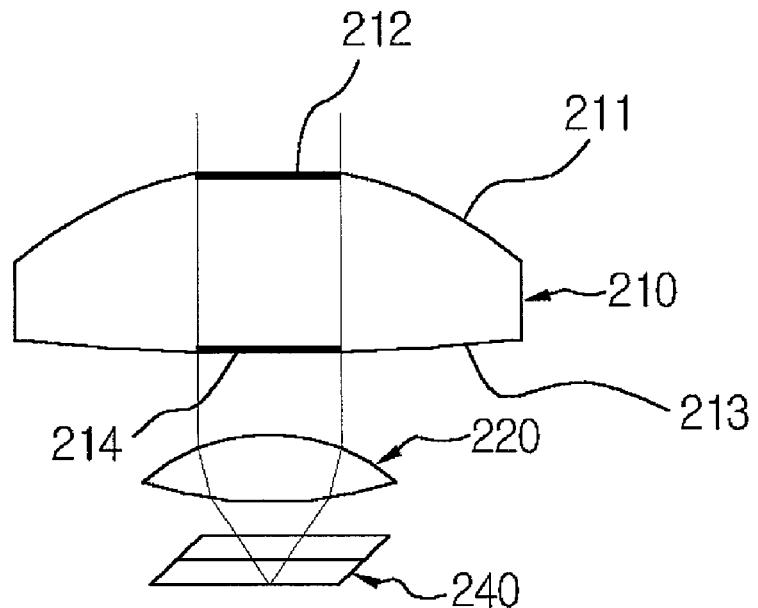
FIG. 3 diagrammatically shows an optical path of a digital video disk (DVD) use optical system in an optical system for use of an optical pickup apparatus in accordance with the present invention.
Figure 4:
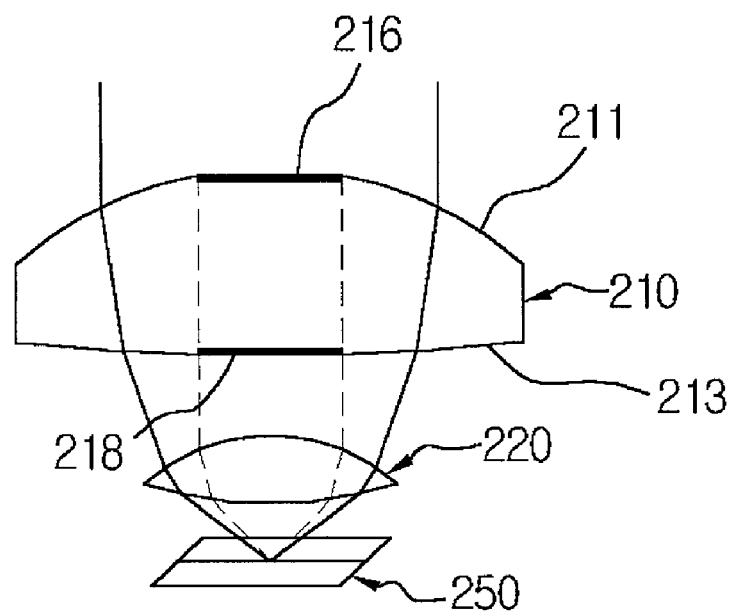
FIG. 4 diagrammatically shows an optical path of a HD use optical system in an optical system for use of an optical pickup apparatus in accordance with the present invention.

More details are provided with reference to FIG. 3 and FIG. 4.

FIG. 3 is a diagram showing an optical path particularly of the DVD use optical system in the optical system for use of the optical pickup apparatus in accordance with the present invention. According to the optical path of the DVD use optical system shown in the drawing, the DVD use light beam is incident upon the flat domain 212 on the incident plane of the first objective lens 210. The light beam incident upon the flat on the outgoing plane of the first objective lens 210, and is incident upon the second objective lens 220. The DVD use light beam is incident upon the second objective lens 220 is focused on the DVD use disk 240 with a thickness of 0.6 t. Here, the second objective lens 220 can be designed especially for the DVD use disk 240 in order to focus the incident light beam upon the second objective lens 220 on the DVD use disk 240.

In the meantime, the flat domains 212 and 214 of the first objective lens 210 are coated to transmit the DVD light beam only (wavelength: 650 nm). In this manner, when the HD use light beam (wavelength: 405 nm) incidents upon the first objective lens 210, it cannot transmit the coated domains 212 and 214, but transmits the non-coated aspheric domains 211 and 213 instead. domain 212 of the incident plane then transmits through the flat domain 212.

FIG. 4 is a diagram showing an optical path particularly of the HD use optical system in the optical system for use of the optical pickup apparatus in accordance with the present invention. Typically, to increase the numerical aperture, the HD use light beam can be incident more broadly than the DVD use light beam. According to the optical system for use of the optical pickup apparatus of FIG. 4, the HD use light beam with a large optical width is incident very broadly to be able to cover the coated domains 216 and 218 of the first objective lens 210. The HD use light beam, at this time, cannot pass through the coated domains 216 and 218. Instead, it transmits through the non-coated aspheric domains 211 and 213, and is incident upon the second objective lens 220. When the light beam is incident upon the second objective lens 220 after passing through the aspheric domains 211 and 213, it focuses on the HD use disk 250 with a thickness of 0.1 t. More desirably, to focus the incident light beam upon the second objective lens 220 on the HD use disk 250, it is preferred that the non-coated domains 211 and 213 be aspheric.

In short, in case of the DVD use disk 240, the second objective lens 220 should be designed suitable for the DVD use disk, while in case of the HD use disk 250, the non-coated domains 211 and 213 of the first objective lens 210 should preferably be aspheric in order to focus the light beam incident upon the second objective lens 220 on the optical system disks 240 and 250.

In such manner, that is, by designing the first objective lens and the second objective lens in an optimal manner, the light beam can be focused on the DVD disk or the HD disk at the same time.

To this end, the second objective lens 220 is preferably a DVD exclusive lens, and the non-coated domains 211 and 213 of the first objective lens 210 should be aspheric.

Thusly configured optical system secures compatibility of the HD use optical system and the DVD use optical system. Although, in case of the HD use optical system, part of lights (or the intensity of the light) could be lost as the central portion of the light beam is blocked, the system can prevent any aberration caused by the differences in thickness of two different kinds of disks. Besides, the HD use optical system yields super resolution effect, which effect in turn resolves problems with light beams for recording/reproducing the HD disk. Further, by selecting appropriate material for the first objective lens and the second lens, the chromatic aberration, a typical problem caused by wavelength change of the laser used as a light source, can be successfully removed.

Figure 5:
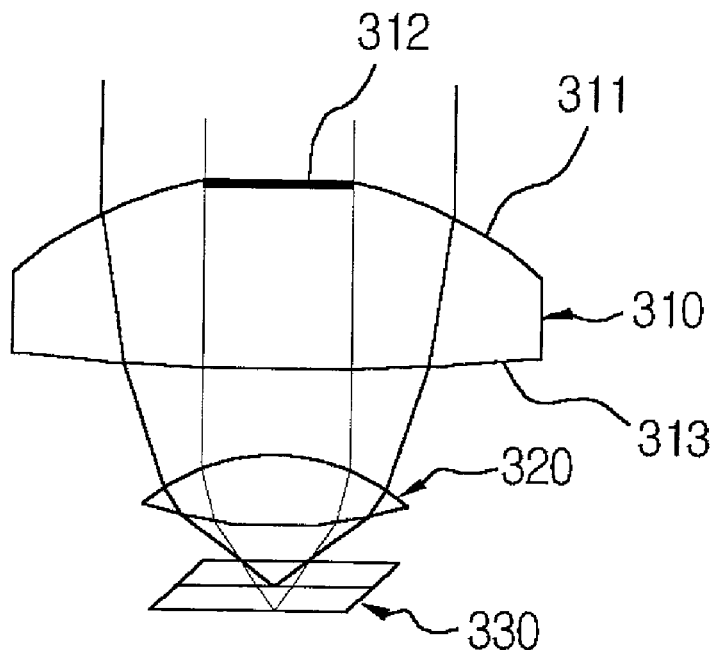
FIG. 5 is a schematic diagram showing a configuration of an optical system for use of an optical pickup apparatus in accordance with another embodiment of the present invention.
Figure 6:
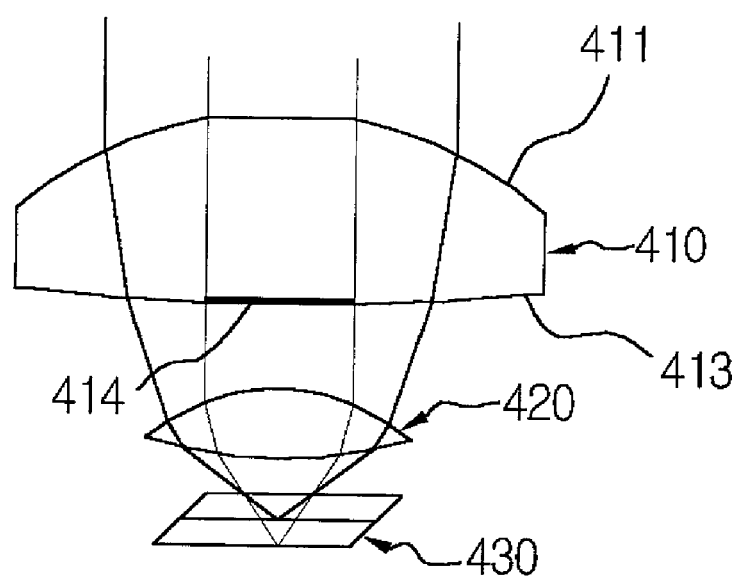
FIG. 6 is a schematic diagram showing a configuration of an optical system for use of an optical pickup apparatus in accordance with still another embodiment of the present invention.

On the other hand, the comparability of the HD use optical system and the DVD use optical system, while preventing any loss of lights, can be obtained by using a diffraction element. FIG. 5 and FIG. 6 are schematic diagrams of an optical system of the optical pickup apparatus according to different embodiments of the present invention. That is to say, the light loss in the HD use optical system can be prevented by forming the diffraction element like hologram optical element (HOE) on a certain portion of the flat domain of the first objective lens shown in FIG. 2. Particularly, FIG. 5 illustrates a case in which the diffraction element is formed on the flat domain of the incident plane of the first objective lens, and FIG. 6 illustrates a case in which the diffraction element is formed on the flat domain of the outgoing plane of the first objective lens.

For example, when the HD use light beam (wavelength 405 nm) incidents upon the first objective lens 310 and 410, the light beam is diffracted by the diffraction element on the incident plane or the diffraction element on the outgoing plane, and then the diffracted light beam incidents upon the second objective lens 320 and 420. On the other hand, the HD use light beam, which incidents upon the aspheric domain 311, 313, 411 and 413 except for the diffraction containing domain 312 and 414, refracts while transmitting the outgoing plane, and incidents upon the second objective lens 320 and 420. Therefore, the diffracted light beam and the refracted light beam are focused on the optical system use disk 330 and 430 by the second objective lens 320 and 420.

In short the HD use light beam that could not transmit through the coated domain of the first objective lens in FIG. 4 could be transmitted through the diffraction element of the first objective lens 310 and 410 as depicted in FIG. 5 and FIG. 6, and is focused on the optical system use disk 330 and 430, without losing the lights as much as possible.

Meanwhile, the diffraction element is preferably designed in such manner that no phase shift occurs when the DVD use light beam (wavelength: 650 nm) passes through the first objective lens 310 and 410.

In this manner, the incident DVD use light beam upon the first objective lens 310 and 410 can transmit the outgoing plane without experiencing the phase shift, and be focused on the optical system use disk 330 and 430 via the second objective lens 320 and 420.

So far, the explanation of the optical pickup apparatus of the present invention has been limited to only the configuration of the objective lens for better compatibility (or interchangeability) of the DVD use optical system and the HD use optical system. However, it is always possible to design a versatile objective lens that can be used not only for the DVD use optical system/HD use optical system but also for the CD optical system, simply by changing the shape and material of the objective lens.

In conclusion, the optical pickup apparatus according to the present invention enables to reproduce/record data for different kinds of disks in different thicknessses by using one single optical pickup, which consequently prevents spherical aberration due to the difference of the thickness between different kinds of disks and compensates the light loss.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. An optical system for use in an optical pickup apparatus for focusing a first light beam and a second light beam, wherein the wavelength of the second light beam is larger than that of first light beam, the system comprising:
   two objective lenses, wherein one objective lens has an incident plane and an outgoing plane, which at least one of the incident plane and the outgoing plane has a predetermined flat domain from an optical axis,
   wherein the predetermined flat domain transmits the second light beam only.

2. The system of claim 1, wherein the predetermined flat domain is coated to transmit the second light beam only.

3. The system of claim 1, wherein a domain other than the predetermined flat domain is formed of an aspheric plane, and the aspheric plane domain transmits the first light beam.

4. The system of claim 1, wherein the other objective lens of the two objective lenses is an exclusive lens for the second light beam.

5. The system of claim 1, wherein the flat domain is mounted with a diffraction element.

6. The system of claim 5, wherein the diffraction element diffracts the first light beam.

7. The system of claim 5, wherein the diffraction element transmits the second light beam without changing a phase thereof.

8. An optical system for use in an optical pickup apparatus for focusing a first light beam and a second light beam, wherein the wavelength of the second light beam is larger than that of the first light beam, the system comprising:
   a first objective lens, including an incident plane and an outgoing plane, which at least one of the incident plane and the outgoing plane has a predetermined flat domain from an optical axis; and
   a second objective lens which focuses a light beam transmitted through the predetermined flat domain of the first objective lens on an arbitrary spot on a disk,
   wherein the predetermined flat domain transmits the second light beam only.

9. The system of claim 8, wherein the light beam transmitted through the predetermined flat domain is the second light beam.

10. The system of claim 8, wherein a domain other than the predetermined flat domain is formed of an aspheric plane, and the light beam transmitting through the aspheric plane is the first light beam.

11. The system of claim 8, wherein the predetermined flat domain is mounted with a diffraction element.

12. The system of claim 11, wherein the diffraction element diffracts the first light beam.

13. The system of claim 11, wherein the diffraction element transmits the second light beam without changing a phase thereof.

14. An optical system for use in an optical pickup apparatus for focusing a first light beam and a second light beam, wherein the wavelength of the second light beam is larger than that of the first light beam, the system comprising:
a first objective lens, of which an incident plane for a light beam is formed at a predetermined flat domain from an optical axis, being mounted with a diffraction element; and
a second objective lens, which focuses an incident light beam transmitted through the diffraction element of the first objective lens on an arbitrary spot on a disk.

15. The system of claim 14, wherein a domain other than the flat domain is formed of an aspheric plane, and the aspheric domain transmits the second light beam.

16. The system of claim 15, wherein an incident light beam transmitted through the diffraction element is the second light beam or the first light beam.

17. The system of claim 16, wherein the diffraction element transmits the second light beam without changing a phase of the same.

18. An optical pickup apparatus for focusing a first light beam and a second light beam, wherein the wavelength of the second light beam is larger than that of the first light beam, comprising:
a light source for emitting the first and second light beams;
a light splitter for transmitting or reflecting the first and second light beams emitted from the light source;
a collimator lens for making the first and second light beams progressed from the light splitter into parallel light beams;
a reflecting mirror for reflecting the parallel light beams transmitted through the collimator lens and alternating an optical path thereof; and
first and second objective lenses, in which the first objective lens includes an incident plane and an outgoing plane,
wherein a flat domain is formed at a designated radius from center on both incident and outgoing planes of the first objective lens,
wherein one or both flat domains of the incident and outgoing planes are coated, and
wherein the first objective lens focuses the alternated light beams reflected by the reflecting mirror on an arbitrary spot on a disk.

19. The apparatus of claim 18, wherein the coated flat domain of one or both incident and outgoing planes of the first objective lens transmits the second light beam only, and a domain other than the flat domain of one or both incident and outgoing planes of the first objective lens transmits the first light beam only.

20. The apparatus of claim 18, wherein the flat domain is mounted with a diffraction element, and wherein the diffraction element diffracts the first light beam, and transmits the second light beam without changing a phase thereof.

21. An optical apparatus for focusing a plurality of light beams, with different wavelengths comprising:
a first objective lens including at least one of an incident plane flat domain and an outgoing plane flat domain, and including an incident non-flat domain and an outgoing non-flat domain, wherein the at least one of the incident plane flat domain and the outgoing plane flat domain is approximately centered about an optical axis; and
a second objective lens placed downstream from the first objective lens,
wherein the first and second objective lenses focus the plurality of light beams onto a disk media, and
wherein at least one of the plurality of the light beams enters the first objective lens through the incident plane flat domain and the at least one of the plurality of the light beams exits the first objective lens through the outgoing plane flat domain.

22. The optical apparatus of claim 21, wherein the at least one of the incident plane flat domain and the outgoing plane flat domain transmits only one light beam of the plurality of light beams.

23. The optical apparatus of claim 22, wherein the at least one of the incident plane flat domain and the outgoing plane flat domain is coated to transmit the only one light beam.

24. The optical apparatus of claim 22, wherein the second objective lens is configured to focus the only one light beam onto the disk media.

25. The optical apparatus of claim 22, wherein at least one of the incident and outgoing non-flat domains of the first objective lens is aspherical.

26. An optical apparatus, comprising:
a first objective lens; and
a second objective lens down stream from the first objective lens,
wherein the first and second objective lenses focus a first light beam and a second light beam onto an optical medium,
wherein the first light beam is of a first wavelength and the second light beam is of a second wavelength different from the first wavelength,
wherein a first portion of the first objective lens prohibits transmission of the first light beam and allows transmission of the second light beam,
wherein a second portion of the first objective lens, different from the first portion of the first objective lens, allows the transmission of the first light beam.

27. The optical apparatus of claim 26, wherein the first portion of the first objective lens includes:
a flat incident domain on an incident side of the first objective lens through which the second light beam enters the first objective lens, or
a flat outgoing domain on an outgoing side of the first objective lens through which the second light beam exits the first objective lens, or both.

28. The optical apparatus of claim 27, wherein
the flat incident domain on the incident side of the first objective lens occupies a center portion of the incident side of the first objective lens, or
the flat outgoing domain on the outgoing side of the first objective lens occupies a center portion of the outgoing side of the first objective lens, or both.

29. The optical apparatus of claim 28, wherein sizes of the flat incident and outgoing domains of the first objective lens are substantially equal.

30. The optical apparatus of claim 28, wherein the flat incident and outgoing domains of the first objective lens are substantially aligned with each other in a direction of an optical axis of the first objective lens.

31. The optical apparatus of claim 27, wherein
the flat incident domain on the incident side of the first objective lens is coated to allow transmission of the second light beam only, or
the flat outgoing domain on the outgoing side of the first objective lens is coated to allow transmission of the second light beam only, or both.

32. The optical apparatus of claim 26,
wherein the second light beam enters the first portion of the first objective lens as a collimated beam and remains collimated as the second light beam exits the first objective lens, and
wherein the second objective lens focuses the collimated second light beam exiting from the first objective lens to the optical medium.

33. The optical apparatus of claim 26, wherein the second portion of the first objective lens includes:
an aspherical incident domain on an incident side of the first objective lens through which the first light beam enters the first objective lens, or
an aspherical outgoing domain on an outgoing side of the first objective lens through which the first light beam exits the first objective lens, or both.

34. The optical apparatus of claim 33, wherein the aspherical incident domain on the incident side of the first objective lens occupies a peripheral portion of the incident side of the first objective lens, or the aspherical outgoing domain on the outgoing side of the first objective lens occupies a peripheral portion of the outgoing side of the first objective lens, or both.

35. The optical apparatus of claim 34, wherein the aspherical incident and outgoing domains of the first objective lens are substantially aligned with each other in a direction of an optical axis of the first objective lens.

36. The optical apparatus of claim 26,
wherein the first objective lens partially focuses the first light beam entering through the second portion of the first objective lens to the optical medium, and
wherein the second objective lens completes the focusing of the first light beam exiting from the first objective lens to the optical medium.

37. The optical apparatus of claim 26, wherein the second light beam enters and exits the first object lens only through the first portion of the first objective lens.

* * * * *